(12) United States Patent
Mihaila et al.

(10) Patent No.: US 7,469,249 B2
(45) Date of Patent: Dec. 23, 2008

(54) QUERY-DRIVEN PARTIAL MATERIALIZATION OF RELATIONAL-TO-HIERARCHICAL MAPPINGS

(75) Inventors: George Andrei Mihaila, Yorktown Heights, NY (US); Sriram Padmanabhan, San Jose, CA (US); Oded Shmueli, Nofit (IL)

(73) Assignee: International Business Machines Corporation, Armonk, NY (US)

(*) Notice: Subject to any disclaimer, the term of this patent is extended or adjusted under 35 U.S.C. 154(b) by 433 days.

(21) Appl. No.: 10/795,534

(22) Filed: Mar. 8, 2004

(65) Prior Publication Data

US 2005/0198055 A1    Sep. 8, 2005

(51) Int. Cl.
*G06F 17/00* (2006.01)
(52) U.S. Cl. .............................. 707/100; 707/1; 707/10; 707/102; 707/104.1; 707/203
(58) Field of Classification Search .................. 707/3, 707/4, 5, 100, 101, 102, 104.1, 1, 10, 203; 705/26; 715/513
See application file for complete search history.

(56) References Cited

U.S. PATENT DOCUMENTS

| 6,665,677 | B1 * | 12/2003 | Wotring et al. | 707/100 |
| 7,219,102 | B2 * | 5/2007 | Zhou et al. | 707/101 |
| 2003/0204511 | A1 * | 10/2003 | Brundage et al. | 707/100 |

OTHER PUBLICATIONS

Zachary G. Ives et al., An XML query engine for network-bound data, Dec. 15, 2001, University of Washington, pp. 380-402.*
U.S. Appl. No. 10/744,424, filed Dec. 22, 2003, N. Zhou et al.
U.S. Appl. No. 10/788,141, filed Feb. 26, 2004, N. Zhou et al.
M-L. Lo et al., "XAS: A System for Accessing Componentized, Virtual XML Documents," ICSE 2001, 10 pages, Canada, May 2001.
M.J. Carey et al., "XPERANTO: A Middleware for Publishing Object-Relational Data as XML Documents," Proceedings of the 26th International Conference on Very Large Databases, VLDB, Egypt, pp. 646-648, 2000.
M. Fernandez et al., "Efficient Evaluation of XML Middle-Ware Queries," ACM SIGMOD 2001, 12 pages, CA, May 2001.
S. Dar et al., "Semantic Data Caching and Replacement," Proceedings of the 22nd VLDB Conference Mumbai, India, pp. 330-341, 1996.

* cited by examiner

*Primary Examiner*—John E Breene
*Assistant Examiner*—Fred I Ehichioya
(74) *Attorney, Agent, or Firm*—Anne V. Dougherty; Ryan, Mason & Lewis, LLP

(57) ABSTRACT

Techniques are provided for automatically rewriting a relational-to-hierarchical mapping into one or more modified mappings. In this way, clients that prefer or require different portions of the mapping-defined data are supported. For example, in one aspect of the invention, a technique for modifying a relational-to-hierarchical mapping in accordance with at least one user query includes the following steps/operations. At least one query associated with a query language that supports a hierarchical data structure is obtained. Further, at least one relational-to-hierarchical mapping for use in translating data associated with a relational data structure into data associated with the hierarchical data structure is obtained. Then, the at least one relational-to-hierarchical mapping is modified based on the at least one query such that data specifically relevant to the at least one query may be generated in accordance with the modified relational-to-hierarchical mapping.

16 Claims, 7 Drawing Sheets

FIG. 6

LET QS BE A SET OF QUERIES. LET T BE A TAGGED TREE VIEW.
1. FOR EACH Q IN QS:
2.   FOR EACH MATCHING MAP $m$ MAPPING STEPS OF Q TO NODES IN T
     a. APPLY CHANGES TO T BASED ON $m$.
     b. MARK VISITED NODES. MARK END NODES.
     c. (OPTIONAL) PUSH FORMULAS "UP" TO FURTHER LIMIT TREE NODES.
3. ELIMINATE USELESS PORTIONS OF THE TAGGED TREE.
4. (OPTIONAL) PUSH FORMULAS "DOWN" TO ELIMINATE USELESS SUBTREES
5. DATA TREE GENERATION.

FIG. 7

1. function AssocF(Node v, Parsed String s, Boolean isMajor)
2. switch(s)
3.    case root/RLP: u ← m(RLP); F ← AssocF(u, RLP, isMajor)
4.    case RLP=Step/RLP: u ← m(RLP); F ← AssocF(v, Step, isMajor)
5.        F ← F and AssocF(v, Step, isMajor)
6.    case RLP = Step: F ← AssocF(v, Step, isMajor)
7.    case Step = child:: NodeTest Predicate*:
8.        u ← m(Step); F ← AssocF(u, Predicate*, isMajor)
9.        F ← v.formula and Exists u.var (v.formula and F)
10.       if (isMajor) then v.formula ← F
11.   case Step = self:: NodeTest Predicate*:
12.        F ← AssocF(v, Predicate*, isMajor)
13.        F ← v.formula and F
14.        if (isMajor) then v.formula ← F
15.   case Predicate* = [PredExp_1]...[PredExp_K]:
16.        F ← F and AssocF(v, PredExp_1, false) and ... and AssocF(v, PredExp_K, false)
17.   case PredExp = RLP:
18.        F ← AssocF(v, RLP, false)
19.   case PredExp = RLP/self::node() op Value:
20.        F ← AssocF(v, RLP, false)
21.        u ← m(self::node() op Value)
22.        F ← F and (v.annotation Op Value)
23.   case PredExp = self::node() Op Value
24.        F ← (v.annotation Op Value)
25. end switch
26. return F

FIG. 8
```
801  EXP       ::= Root | Root '/' RLP
802  RLP       ::= Step | Step '/' RLP
803  Step      ::= AxisName NodeTest Predicate*
804  Predicate ::= '[' PredExp ']'
805  PredExp   ::= RLP | RLP '/ self::node()' Op Value | '/ self::node()' Op Value
806  Op        ::= '=' | '<' | '<=' | '>' | '>=' | '!='
807  NodeTest  ::= NodeName | 'node()'
808  AxisName  ::= 'child::' | 'self::'
```
FIG. 9
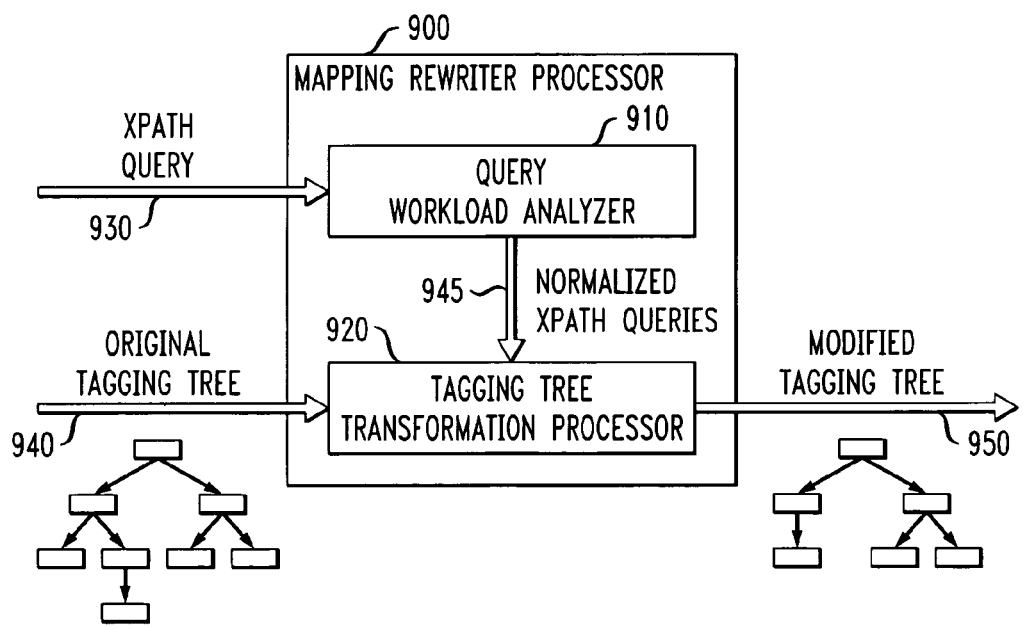
FIG. 10
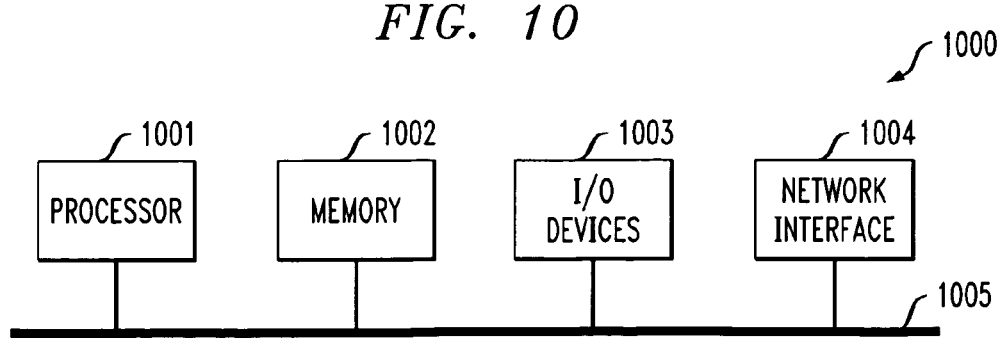

US 7,469,249 B2

QUERY-DRIVEN PARTIAL MATERIALIZATION OF RELATIONAL-TO-HIERARCHICAL MAPPINGS

FIELD OF THE INVENTION

This invention relates to database query techniques and more specifically to producing hierarchical structures containing data obtained from relational databases.

BACKGROUND OF THE INVENTION

Data sets are frequently communicated or delivered in hierarchical data structures. Such hierarchical data structures can be stored in structured documents, such as eXtensible Markup Language (XML) documents. XML documents, for example, are widely accepted by various processing programs and data exchange systems, wherein the data in the XML document is used directly or transformed into a data structure used by the receiving program or system.

In contrast to the communications and delivery of data, database systems are generally used to store and manipulate data. Relational database systems are a popular type of database system due to the many widely known benefits to storing and manipulating data stored in relational databases. Relational databases are generally maintained by software systems that are referred to as Relational Database Management Systems (RDBMS). RDBMSs are generally able to be distributed among two or more computer nodes that are able to be physically and even geographically separated. An enterprise is also able to distribute data among multiple RDBMSs that are hosted on different computers. Retrieval of a complete set of data for a particular request in such enterprises then requires access to the multiple RDBMSs.

A common data manipulation process is the publishing of data out of a database in an XML format. This is currently done by specifying a mapping from a relational database to a hierarchical structure.

Typically, the generated hierarchical structure is exported to multiple clients. Each client subsequently queries this structure via an XML query language such as XML Query, eXtensible Stylesheet Language (XSL) or XML Path Language (XPath). The queries executed by a client will typically explore only a limited portion of the generated XML data, and each client will explore different portions of the data. Therefore, an XML document, which can be quite large and which is not going to be used in its entirety, is generated and transmitted.

Accordingly, there is a need for improved techniques for generating and transmitting documents such that each client may receive only the data that is relevant for its queries.

SUMMARY OF THE INVENTION

Techniques for use in, for example, generating and transmitting documents are provided in accordance with principles of the present invention. More particularly, techniques are provided for automatically rewriting a relational-to-hierarchical mapping into one or more modified mappings. In this way, clients that prefer or require different portions of the mapping-defined data are supported. Such modified mappings may thus be considered "query-driven partial materializations" of the original mappings.

In one aspect of the invention, a technique for modifying a relational-to-hierarchical mapping in accordance with at least one user query includes the following steps/operations. At least one query associated with a query language that supports a hierarchical data structure is obtained. Further, at least one relational-to-hierarchical mapping for use in translating data associated with a relational data structure into data associated with the hierarchical data structure is obtained. Then, the at least one relational-to-hierarchical mapping is modified based on the at least one query such that data specifically relevant to the at least one query may be generated in accordance with the modified relational-to-hierarchical mapping.

Further, the step/operation of obtaining at least one query associated with a query language that supports a hierarchical data structure further includes obtaining at least one query associated with an eXtensible Markup Language (XML) based query language such as, for example, XML Query, eXtensible Stylesheet Language (XSL) or XML Path Language (XPath).

Still further, the technique further includes the step/operation of analyzing the at least one query to identify one or more expressions associated with the at least one query. The one or more expressions may include one or more XPath expressions. The one or more XPath expressions may be normalized.

The step/operation of modifying the at least one relational-to-hierarchical mapping based on the at least one query may further include the steps/operations of: (i) applying each of the one or more expressions respectively to one or more tagging trees defining the relational-to-hierarchical mapping, each tagging tree including one or more nodes, and attaching one or more formulas to appropriate nodes in each tagging tree; (ii) marking the tagging tree nodes traversed during the expression application step as visited; (iii) marking the node corresponding to an output node of the expression as an end node; (iv) superimposing the modified tagging trees respectively resulting from the application of each expression to form a resulting tagging tree; and (v) removing the nodes not marked as visited from the resulting tagging tree, the resulting tagging tree representing the modified relational-to-hierarchical mapping.

At least a portion of the one or more formulas may be pushed up from a child node of a tagging tree to a parent node of the tagging tree so as to further limit the amount of data being generated. At least a portion of the one or more formulas may be pushed down from a parent node of a tagging tree to a child node of the tagging tree so as to prune one or more irrelevant subtrees of the tagging tree.

The step/operation of applying an expression to a tagging tree may include the steps/operations of: (i) parsing the expression into constituent main steps and zero or more predicate expressions; (ii) recursively traversing the tagging tree according to the current step in the expression; and (iii) using the predicate expressions to generate one or more formulas reflecting one or more conditions to be imposed on generated data and attaching the one or more formulas to the nodes that generate the data involved in the expression.

In another aspect of the invention, a technique for generating a hierarchically structured document in response to at least one user query includes the following steps/operations. At least one query associated with a query language that supports a hierarchical data structure is obtained. At least one relational-to-hierarchical mapping for use in translating data associated with a relational data structure into data associated with the hierarchical data structure is obtained. The at least one relational-to-hierarchical mapping is modified based on the at least one query. Then, a hierarchically structured document including data specifically relevant to the at least one query is generated in accordance with the modified relational-to-hierarchical mapping.

Furthermore, it is to be appreciated that a tagging tree may include a plurality of nodes and each of the plurality of nodes may have a node type. Node types may include element nodes and attribute nodes. Each tagging tree node may be annotated with a formula that specifies the data to be inserted at that location in the data generation process. The techniques of the invention may further include the step/operation of traversing at least one node of the tagging tree and retrieving, in response to traversing an execution node, a data object from the at least one relational database as specified in the execution node. The techniques may further include inserting, in response to a data node and based upon the mapping, the data object into an output conforming to the hierarchical structure.

Each modified mapping may reflect a query workload of a client and results in the generation of data that are relevant for that workload. The techniques of the invention may include transforming XPath expressions into normalized XPath expressions that contain only self and child axes navigational steps, applying these normalized path expressions to the tagging tree defining the relational-to-hierarchical mapping, and propagating conditions from the predicates present in the path expression to the appropriate nodes of the tagging tree.

In yet another aspect of the invention, a mapping rewriting processor includes query workload analyzer and a tagging tree transformation processor that modifies a tagging tree in accordance with the query workload. The query workload analyzer may examine the queries in a given workload and produce normalized XPath expressions corresponding to this workload. The tagging tree transformation processor may further have a runtime environment that traverses at least one node of the tagging tree and modifies the formula annotating this node in accordance with a normalized path expression from the workload.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 illustrates mapping rewriting stages according to an exemplary embodiment of the present invention;

FIG. 7 illustrates an algorithm for attaching formulas to nodes of the tagging tree for a given query and matching of this query to the tagging tree according to an exemplary embodiment of the present invention;

FIG. 8 illustrates a grammar of normalized XPath expressions;

FIG. 9 illustrates an architecture of a mapping rewriting processor according to an exemplary embodiment of the present invention; and FIG. 10 illustrates a computer system suitable for implementing mapping rewriting stages according to an exemplary embodiment of the present invention.

DETAILED DESCRIPTION OF PREFERRED EMBODIMENTS

It is to be understood that while the present invention will be described below in the context of XML documents and relational databases, the invention is not so limited. Rather, the invention is more generally applicable to any document type and database type in which it would be desirable to provide techniques for generating and transmitting documents such that each client may receive only the data that is relevant for its queries.

As will be described in detail below, exemplary embodiments of the present invention provide for rewriting a relational-to-hierarchical mapping into several modified mappings, in accordance with client query workloads. The relational-to-hierarchical mapping is specified at the schema level, rather than at the instance level, and is represented as a tagging tree. One or more XML DTDs (Document Type Definitions) or XML Schema define the structure of XML data objects. Database schemas define the structure of the relational data.

Exemplary embodiments of the present invention are capable of being advantageously applied to tasks in a variety of applications such as, by way of example only, data management, business-to-business message exchange, and content management. An especially advantageous application is the custom transformation of relational data to specific XML dialects such as HTML (Hypertext Markup Language), VXML (Voice XML) and WML (Wireless Markup Language), in order to support various display devices and specific client workloads.

The principles of mapping rewriting according to the invention address many challenging issues such as: (1) analyzing the query workload and producing a set of normalized XPath expressions; (2) using a normalized XPath expression to determine which parts of the tagging tree are relevant; (3) using a normalized XPath expression to determine which formulas to attach at different nodes in the tagging tree in order to restrict the generation of data to relevant data for this expression; and (4) combining the effects of rewritings from a plurality of normalized XPath expressions on the same tagging tree.

The illustrative methodology described herein completes the mapping rewriting in two steps. The first part is a query analysis and normalization step. The queries in the workload are processed one at a time and rewritten into normalized XPath expressions. The second part is a tagging tree rewriting step. Each normalized path expression is processed in turn and results in various formulas being attached to specific nodes of the tagging tree. The resulting modified tagging trees are then superimposed by disjoining the formulas attached to the same node.

Figure 1:
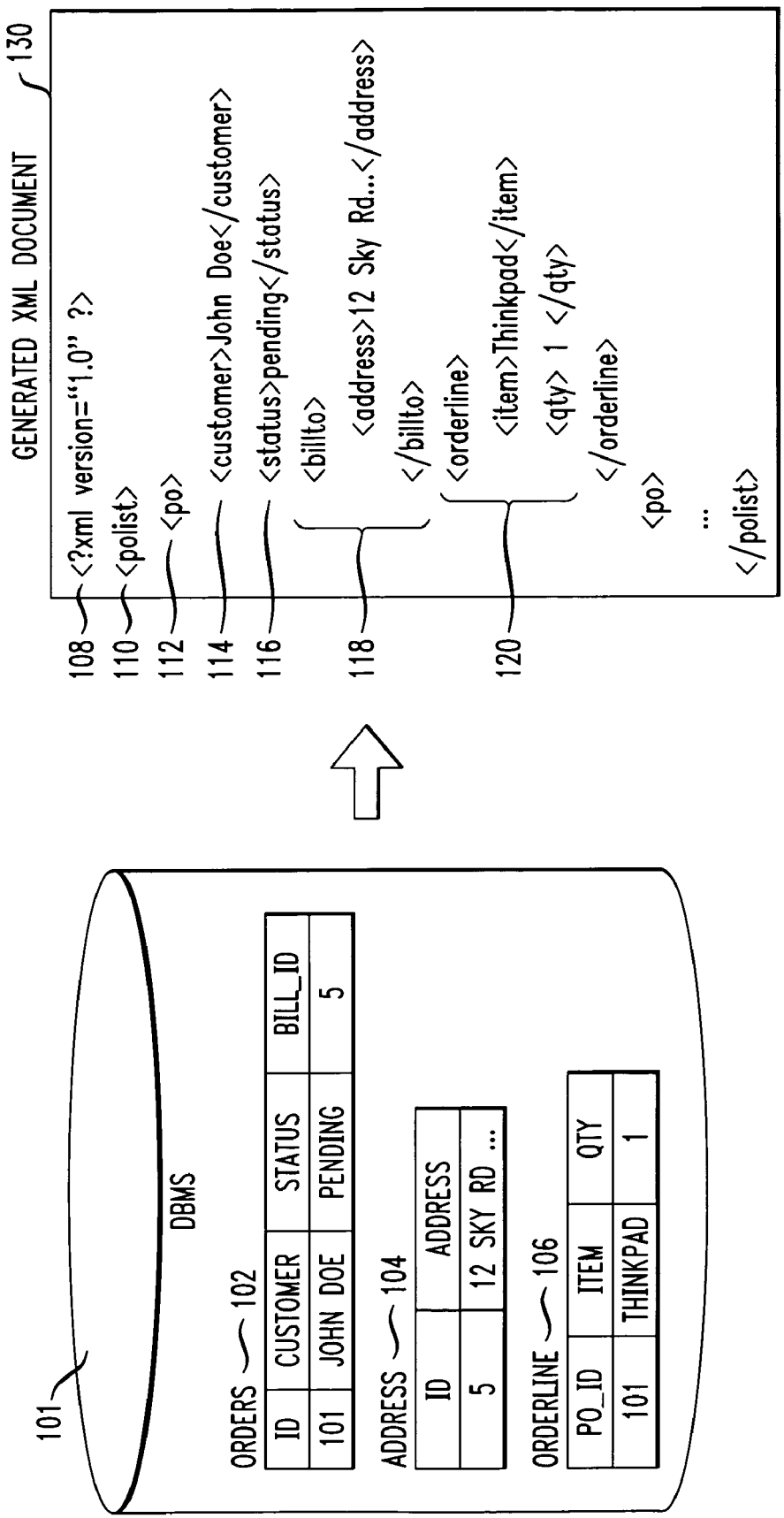
FIG. 1 illustrates an exemplary data transformation diagram according to an exemplary embodiment of the present invention.

Referring initially to FIG. 1, an exemplary data transformation diagram according to an exemplary embodiment of the present invention is illustrated. More particularly, the data transformation diagram illustrates an exemplary RDBMS set of tables and a resulting published XML document generated in accordance with an exemplary embodiment of the present invention.

The RDBMS 101 in this example contains a number of tables. Illustrated in the RDBMS 101 in this example are three tables that contain a description of one purchase order. These three trivially simple tables are illustrated here for ease of understanding of the publishing process. The exemplary embodiment operates with one or more RDBMSs that maintain complex database tables. These three tables could also be visualized as results sets that would be produced by conventional processing, which would execute the two exemplary queries in series to produce these result sets from a more populated set of database tables. The operation of the exemplary embodiment would not, however, explicitly produce these results sets but rather produce the outer-union result set described below.

The "ORDERS" table 102 in this illustration is shown to contain one row that contains a description of a purchase order (PO) that is stored in the RDBMS 101. This purchase order has an ID element containing "101," which is an identification number used only by the RDBMS 101 to identify this purchase order and related elements in the same or other tables maintained by this RDMBS 101. This purchase order also has a customer element containing "John Doe" and a status element containing "pending." An "ADDRESS" table 104 contains one row that corresponds to the "bill_id" of "5," as was identified in the "PO" result set 102. The item and quantity for the items on this purchase order is similarly contained in a third table 106 called "ORDERLINE".

The data in the RDBMS 101 is published to a generated XML document 130 as illustrated. A first tag 108 identifies the XML version in use by this document. A root tag 110 specifies the root name for this structured document. Within the "polist" section of this document is a subsection with a "po" tag 112. The "customer" element 114 and "status" element 116 correspond to data contained in the "PO" table 102. The "billto" section 118 of this document has a subsection "address" whose data corresponds to the data contained in the "ADDRESS" table. The "ID" element, which identifies the purchase order for the RDBMS 101, is not included in this structured XML document since the data relationships are denoted by the structure of the document and not by record identifiers. Further, the exemplary XML document contains one "orderline" section that begins with an "orderline" tag. All tags in this XML document have corresponding closing tags as is well known.

Figure 2:
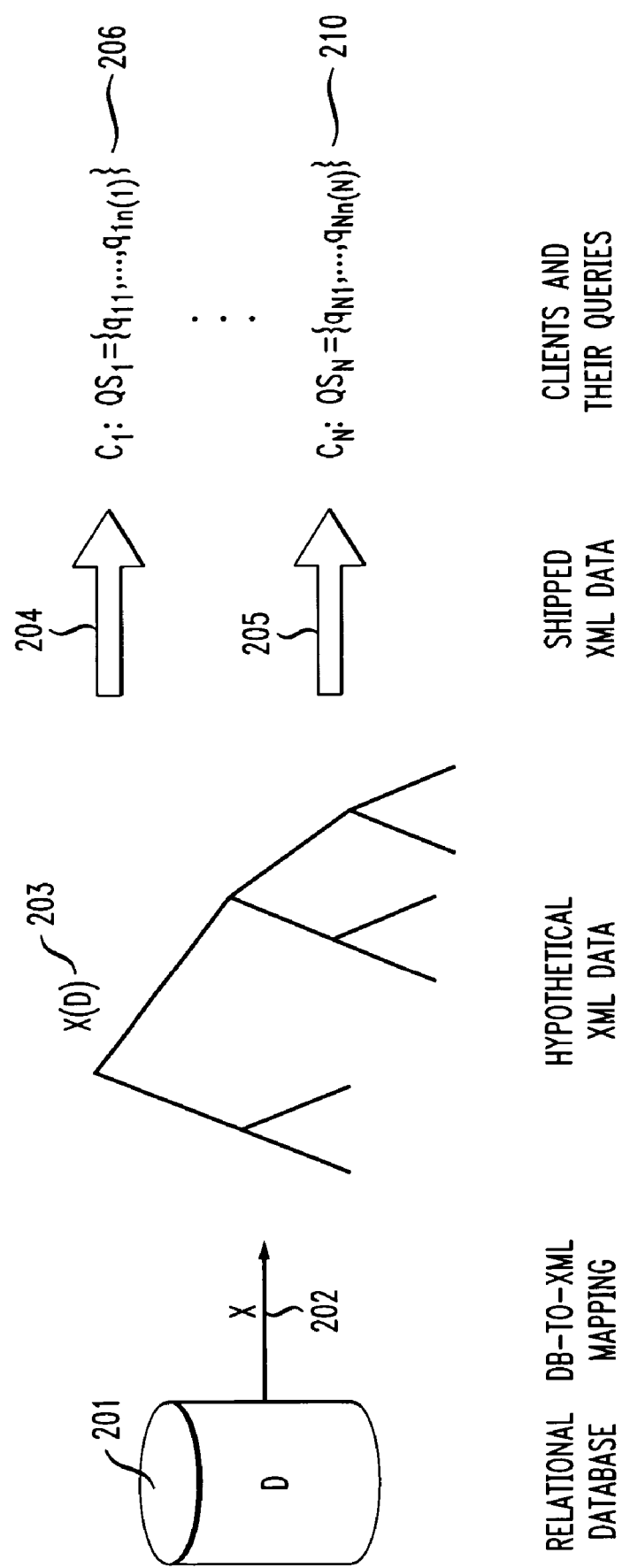
FIG. 2 illustrates an exemplary multiple client scenario according to an exemplary embodiment of the present invention.

Referring now to FIG. 2, an exemplary multiple client scenario according to an exemplary embodiment of the present invention is illustrated. In this exemplary scenario, a data provider uses a relational database 201 to store facts in tables (such as "ORDERS", "ADDRESS", "ORDERLINE"). In order to export this data, the data provider defines a DB-to-XML mapping 202. This mapping could be applied as-is to generate an XML document 203 composed of a hierarchical representation of the entire collection of facts present in the tables of the relational database. However, shipping this document to clients would be inefficient, especially if the clients are interested only in a relatively small portion of the data. This is why we refer to the XML document 203 as "hypothetical XML data".

Instead, the system of the present invention generates a custom XML document for each client, containing relevant data for that client. For example, consider a client $C_1$ (206) that plans to run the set of queries $QS_1 = \{q_{11}, \ldots, q_{1n(1)}\}$, referred to as a "query workload". The system of the present invention analyzes the set of queries $QS_1$ and generates a custom XML document 204 to be shipped to client $C_1$. Similarly, the system generates a custom XML document for each client according to its query workload.

Figure 3:
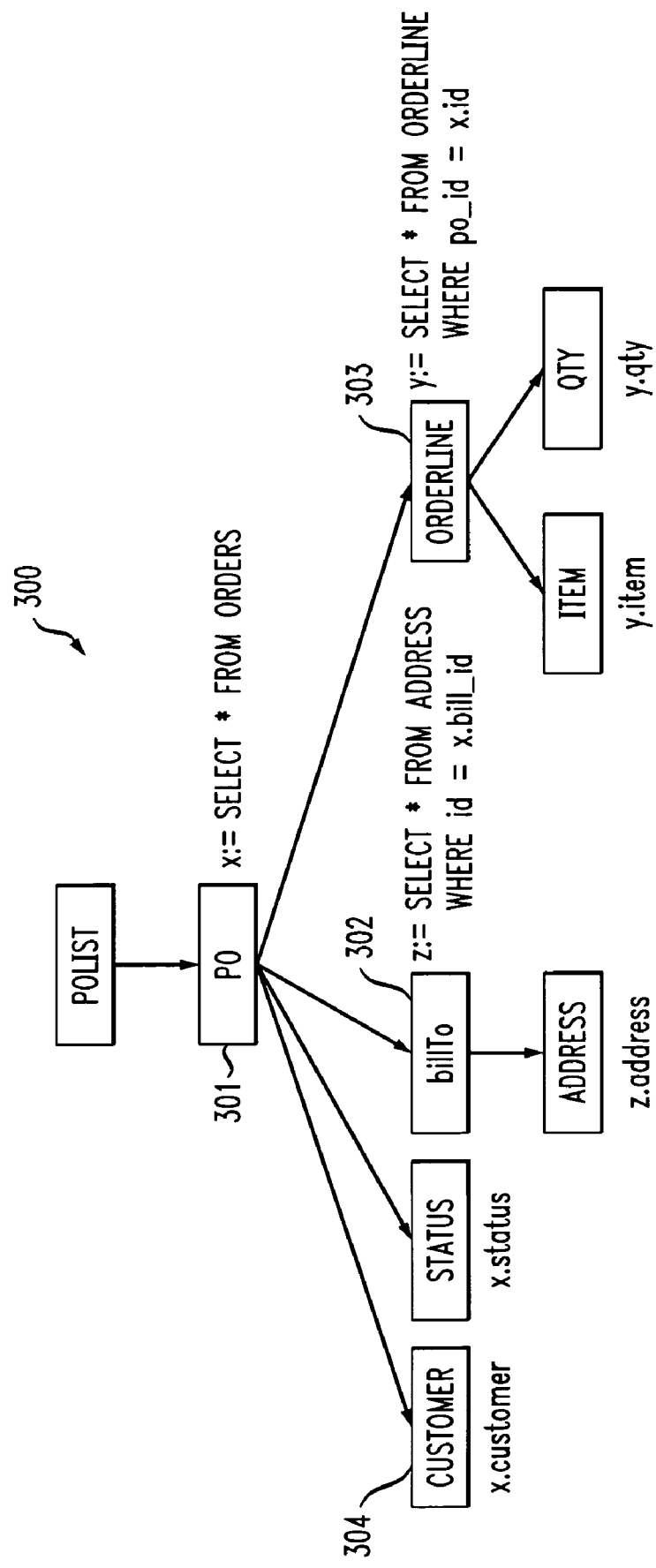
FIG. 3 illustrates an exemplary tagging tree according to an exemplary embodiment of the present invention.

Referring now to FIG. 3, an exemplary tagging tree 300 according to an exemplary embodiment of the present invention is illustrated. Tagging trees as are used by exemplary embodiments of the present invention have nodes that can be one of two node types and can be annotated with formulas that have been defined for a tagging tree by the particular embodiment. The two node types and their formulas define the features of the transformation from a relational database to the hierarchical data structure of the XML output document.

The two tagging tree nodes types are: element and attribute. Element nodes contain an element name and have as children zero or more attribute nodes and zero or more element nodes. Element nodes generate XML elements composed of a start tag (e.g., "<po>"), variable length contents, and an end tag (e.g., "</po>"). Attribute nodes contain an attribute name. Attribute nodes generate XML attribute expressions of the form "attribute name=attribute value" that are inserted inside the start tag of the element generated by the parent element node.

The nodes in the exemplary tagging tree 300 are annotated with formulas, as shown in FIG. 3. The element node "po" 301 is annotated with an SQL (Structured Query Language) query that retrieves all the rows from table "Orders" and binds them to a variable x. The element node "billto" 302 is annotated with an SQL query that retrieves the address row from the table "Address" such that the identifier of this address (the ID column) matches the BILL_ID column of the current row extracted from the Orders table. This results in the extraction of the billing address for the current purchase order and its binding to a variable z. Similarly, the SQL query annotating the element node "orderline" 303 extracts all the rows from the Orderline table that have in the PO_ID column a value that matches the ID of the current Orders row.

The leaf nodes in the exemplary tagging tree 300 are annotated with formulas that specify the value to be inserted in the generated data tree. Thus, for example, the "customer" element node 304 is annotated with the expression "x.customer" indicating that its value should be extracted from the CUSTOMER column of the current row that is bound to the variable x.

Figure 4:
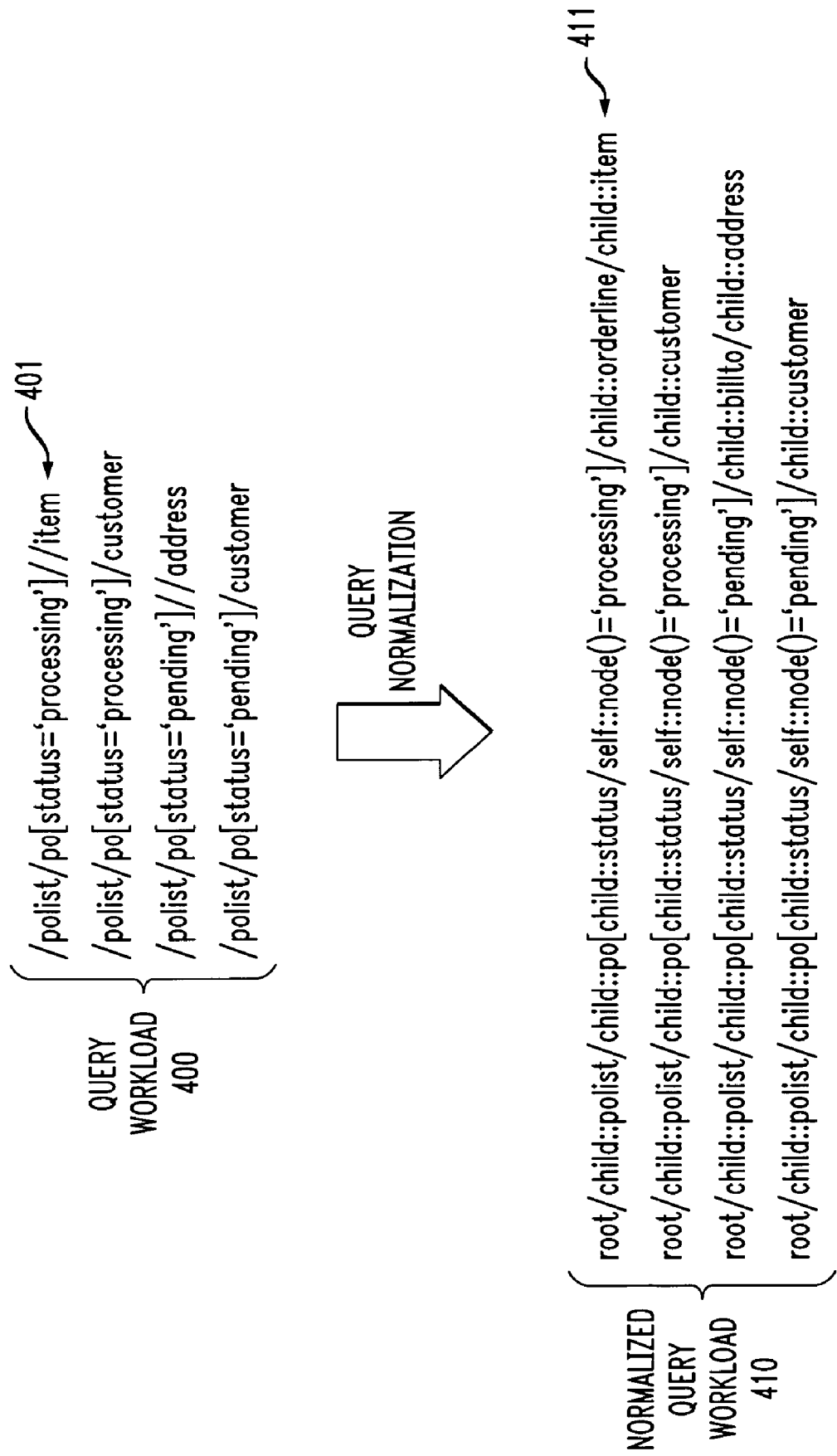
FIG. 4 illustrates a typical query workload and the result of a normalization algorithm according to an exemplary embodiment of the present invention.

Referring now to FIG. 4, a typical query workload and the result of a normalization algorithm according to an exemplary embodiment of the present invention is illustrated. The exemplary query workload 400 as shown in FIG. 4 includes four XPath queries. For example, the query 401 requests the "item" information for all the purchase orders whose status is "processing". The query 401 is not in normal form because it contains the "descendant-or-self" axis navigation step "//item" that indicates that the "item" element is to be found as a descendant node at any depth from the previous node in the expression "po". The normalized query workload is denoted as 410.

The normalization algorithm in an exemplary embodiment of the present invention identifies all the possible matches between the path expression 401 and the tagging tree 300 by simulating the execution of the path expression 401 on the tagging tree 300. The result of this simulated execution is the normalized path expression 411. The expression conforms to the non-abbreviated XPath syntax in accordance with the XPath standard defined by the World Wide Web Consortium Recommendation "XML Path Language (XPath)" available at http://www.w3.org/TR/xpath. Although in this simple example there was a single normalized expression produced, in general, the algorithm produces a plurality of normalized expressions, one for each possible match between the original path expression and the tagging tree.

Another result of the normalizing algorithm is a plurality of "matching maps". A matching map associates each step of a normalized path expression with a node in the tagging tree such that the first step is mapped to the root node, the element names match and the parent-child relationship is preserved.

Thus, for example, the "root" step of expression 411 is mapped to the root of the tagging tree, the "child::polist" is mapped to the "polist" node, the "child::po" step is mapped to the "po" node, the "child::status="processing"" step inside the predicate expression is mapped to the "status" node, the "child::orderline" is mapped to the "orderline" node, and the "child::item" node is mapped to the "item" node.

Figure 5:
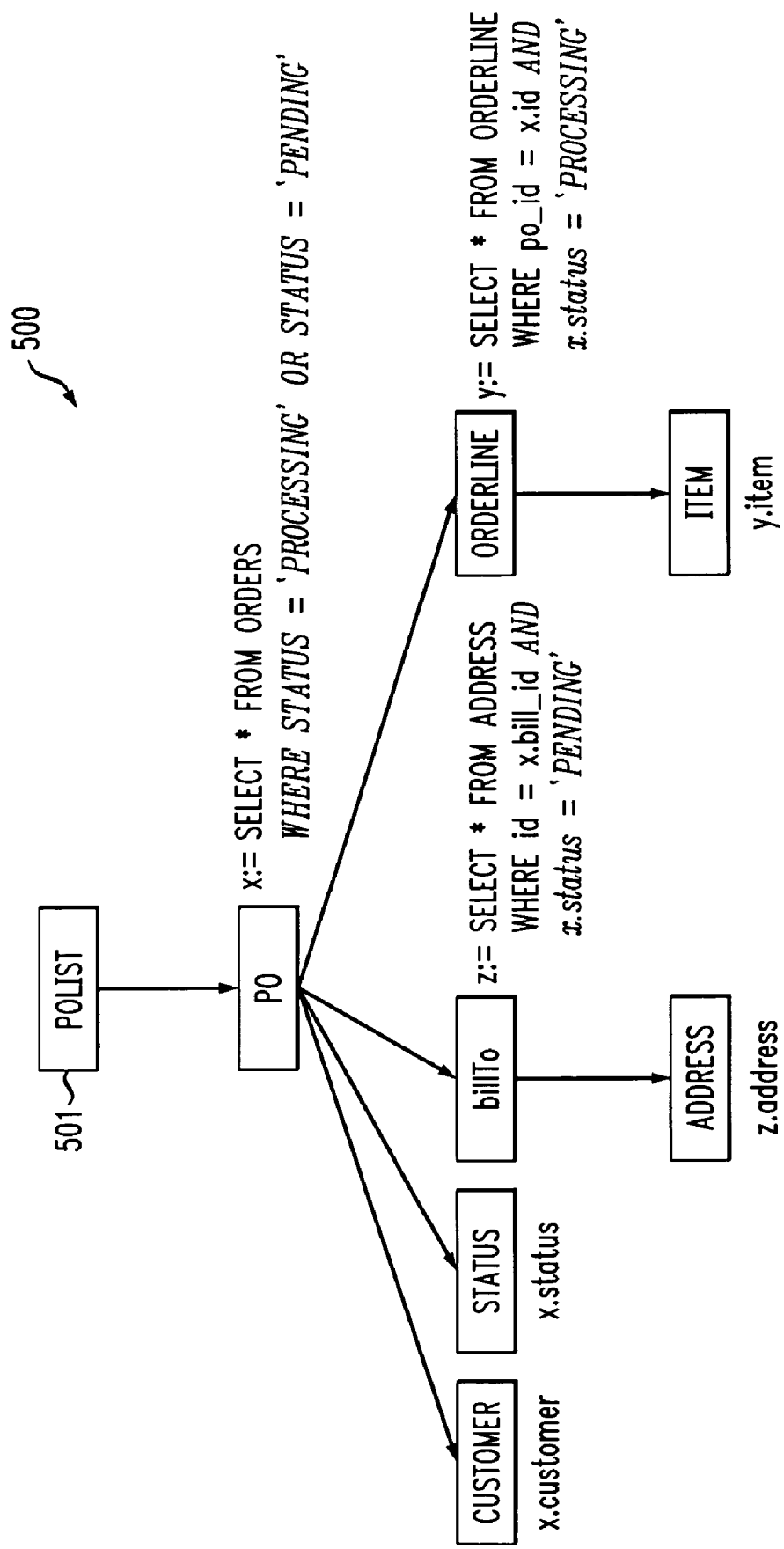
FIG. 5 illustrates a modified tagging tree corresponding to the workload in FIG. 4 according to an exemplary embodiment of the present invention.

Referring now to FIG. 5, a modified tagging tree corresponding to the workload in FIG. 4 according to an exemplary embodiment of the present invention is illustrated. More particularly, FIG. 5 depicts modified tagging tree 500. As shown, the formula attached to node "po" has been modified by adding a disjunction of conditions about the status of the order that result from the application of the rewriting algorithm on the queries in the query workload 410. Similarly, the formulas attached to the "billto" and "orderline" nodes have been modified as a result of the "formula push-down" (as will be explained below in step 4 of FIG. 6).

Referring now to FIG. 6, mapping rewriting stages according to an exemplary embodiment of the present invention are illustrated. The mapping rewriting stages are as follows: each query Q in the query workload QS is examined and the tagging tree is modified according to the current query (step 1). Each query Q may have a plurality of matching maps m that associate the steps of Q to nodes in the tagging tree T. Each such matching map m is considered in turn (step 2) and the following steps are performed for each matching map: (a) the formulas attached to nodes of T are modified according to the algorithm AssocF (given in FIG. 7 and described below); (b) all the nodes to which the matching map m maps the steps of Q are marked as "visited" and the node to which the matching map m maps the last major step of Q is marked as "end" node; (c) optionally, some formulas are "pushed up" to ancestor nodes ("push up" step described below).

After all of the above steps have been performed for all the queries and the matching maps associated to them, the tree is pruned by eliminating all the nodes not marked as "visited" together with all the edges leading to them (step 3). Step 4 is an optional step consisting in "pushing down" some of the formulas attached to nodes in the tagging tree to further limit the number of sub-trees being generated. Finally, in step 5, the data tree is generated by traversing the modified tagging tree in a top-down fashion and retrieving the data from the relational database according to the modified formulas attached to the nodes (as described above in accordance with FIG. 3).

Referring now to FIG. 7, an algorithm is illustrated for attaching formulas to nodes of the tagging tree for a given query and matching of this query to the tagging tree according to an exemplary embodiment of the present invention.

More particularly, the algorithm depicted in FIG. 7 is a recursive procedure, named AssocF, which associates formulas to nodes in the tagging tree. A goal of the algorithm is to restrict the corresponding image data to data that is relevant to the normalized expressions in the query workload.

Consider a normalized expression e in the query workload and a matching map denoted m that maps each step in e to a node in tagging tree T. We now describe how the procedure AssocF modifies the formulas attached to the nodes on T based on map m.

The algorithm AssocF examines the parsed normalized expression e and the tree T in the context of the matching map m. Inductively, once the algorithm is called with a node v in T and a parsed sub-expression, it returns a formula F which represents conditions that must hold at that node v for the recursive call to succeed in a data tree generated from Tat the corresponding image node.

Some of the formulas returned by AssocF, the ones corresponding to Predicate* sequences on the major steps of e, are attached to tree nodes (at lines 10 and 14), the others are simply returned to the caller with no side effect. The information about whether the algorithm AssocF is currently processing a major step is encoded in the Boolean parameter is Major.

Let v.formula be the original formula labeling the node v in the tagging tree T; in case of a data annotation, the formula is v.annotation !=NULL; in case of no annotation at all, v.formula is True.

Initially, the algorithm is invoked as follows: AssocF(root, e, True).

At this point, let us review the effect of AssocF. Consider a matching map m for normalized expression e. Let $Step\_1/\ldots/Step\_N$ be the major steps in the major path of e, that is, those steps not embedded within any brackets [ . . . ]. Let $v\_1, \ldots, v\_N$ be the respective nodes of T to which m maps $Step\_1, \ldots, Step\_N$. Algorithm AssocF attaches formulas $G\_1, \ldots, G\_N$ that will specify the generation of image data for node $v\_i$ only if all predicates applied at $Step\_i$ are guaranteed to hold. In other words, image data generation for nodes along the major path of e is filtered.

Note that this filtering holds only for the current matching m. In order to reflect the changes mandated by all the matching maps for all the path expressions in the query workload, the rewritings triggered by each matching map are superimposed.

Algorithm AssocF handles one matching map m of an expression e. Let m' be another matching map. Intuitively, each such matching map should be supported independently of the other.

A straightforward approach is to rewrite a formula at a node v that is in the range of some matching maps, say $m\_1, \ldots, m\_k$ to v.formula and $(F\_1 \text{ or } \ldots \text{ or } F\_k)$, where $F\_i$ is the formula attached to node v by AssocF based on matching map $m\_i$.

The approach above may lead to unnecessary image data generation because the nodes that are descendants of v will be produced for all the rows retrieved by the query at v even if they are only needed only when a particular $F\_i$ is true (for example, in FIG. 5, the "billto" node is needed only when the "formula x.status='pending'" is true).

The solution is to perform an optional "formula push-down" step (step 4 in FIG. 6). This step includes pushing each formula $F\_i$ to the descendants of node v that were visited during the invocation of AssocF in the context of matching map $m\_i$. For example, in FIG. 5, the formula "x.status='pending'" is pushed to the "billto" node and the formula "x.status='processing'" is pushed to the "orderline" node.

Another optional optimization step is the formula "push-up" step 2c in FIG. 6. This step proceeds as follows: let v be a node in T that is not an end node or an ancestor of an end node or the image of a last step in a predicate expression. Let F be the formula attached to this node. Let $v1, \ldots, v\_k$ be visited children, associated respectively with formulas $f\_1, \ldots, f\_k$. Let $x\_i$ be the variable bound at node $v\_i$ or some other, previously unused, variable otherwise. Modify F to $F'=F \text{ and } (\text{Exists } x\_1 \, (f\_1) \text{ or } \ldots \text{ or } \text{Exists } x\_k \, (f\_k))$.

The intuition of this push up step is that the data generated as the image of node v is filtered by its formula as well as the requirement that this data will embed generated data for at least one child. There is no point in generating a data element e for v data does not pass this filtering. Such a data element cannot possibly be useful for data tree matching by the expression mapping implied by m.

Push-up steps may be performed in various parts of the three. The benefit of pushing lies in the further filtering of image data node generation. The cost of extensive filtering is that:

(a) resulting formulas are complex; and (b) some computations are repeated (that is, a condition is ensured, perhaps as part of a disjunction, and then rechecked for a filtering effect further down the tree).

Therefore, there is a tradeoff for formula push-up: less "useless" image data is generated, but the computation is more extensive.

Referring now to FIG. 8, a grammar of normalized XPath expressions is illustrated. Thus, line 801 states that an XPath expression is either a Root step by itself or a Root step followed by a '/' step delimiter, followed by a relative path expression RLP. Line 802 specifies that a relative path expression RLP is composed of either a single Step or by a Step followed by a delimiter followed by a relative path expression (note that this is a recursive definition, allowing any number of steps to be specified). Line 803 specifies that a Step is composed of an axis name Axis Name followed by a node test NodeTest followed by a sequence of zero or more predicates Predicate. Line 804 states that a Predicate is a predicate expression PredExp enclosed in angular brackets.

Line 805 states that a predicate expression PredExp can be one of: 1) a relative path expression RLP by itself; or 2) a relative path expression RLP followed by an expression of the form '/self::node( )' followed by a comparison operator Op followed by a constant value Value; or 3) an expression of the form '/self::node( )' followed by a comparison operator Op followed by a constant value Value.

Line 806 states that a comparison operator Op is one of: "equal", "less than", "less or equal", "greater than", "greater or equal", and "not equal". Line 807 states that a node test NodeTest can be either a node name (an XML element name) which matches nodes with that name or the expression 'node( )' which matches any node. Finally, line 808 states that the axis name can only be one of 'child::' (which indicates a traversal to a child node) or 'self::' (which indicates that the current node is the same as in the previous step).

Referring now to FIG. 9, a system architecture illustrates the components of the mapping rewriter processor and the interactions between them. As shown, a Mapping Rewriter Processor 900 is composed of two components: a Query Workload Analyzer 910 and a Tagging Tree Transformation Processor 920, whose functions are described below.

The Query Workload Analyzer 910 accepts as input a query workload 930 composed of a plurality of XPath queries and has access to the original tagging tree defining the mapping. Based on the structure of the original tagging tree, the Query Workload Analyzer 910 simulates the execution of each query from the workload by traversing the tagging tree according to the steps specified in the query as described in the query normalization algorithm (presented above in the description of FIG. 4). The output of the Query Workload Analyzer component is a set of normalized XPath queries 945 which is sent to the Tagging Tree Transformation Processor 920.

The Tagging Tree Transformation Processor 920 accepts as input an original tagging tree 940 and a set of normalized XPath queries 945 and computes a modified tagging tree 950. This modified tagging tree is obtained by modifying the formulas attached to the nodes of the original tree according to the algorithm AssocF (presented above in the description of FIG. 7) followed by the elimination of all the nodes that were not marked as visited during the execution of the algorithm.

Many advantages flow from the use of exemplary embodiments of the present invention. By way of example, some of the advantages include:

(a) amount of data shipped to the clients is considerably reduced which results in smaller communication costs as well as query processing costs at the client site; and (b) schema of the shipped data is the same as the original schema of the mapped hierarchical data which means that the client queries do not have to be modified in order to process this data.

It is to be appreciated that embodiments of the invention can be implemented as a program product for use with a computer system such as, for example, the computer system shown in FIG. 10 and described herein below. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is composed of a multitude of instructions that will be translated by the native computer into a machine-readable format and hence executable instructions. Also, programs are composed of variables and data structures that either reside locally to the program or are found in memory or on storage devices. In addition, various programs described herein may be identified based upon the application for which they are implemented in a specific embodiment of the invention. However, it should be appreciated that any particular program nomenclature is used merely for convenience, and thus the invention should not be limited to use solely in any specific application identified and/or implied by such nomenclature.

It is also to be appreciated that computer programs may be organized into a variety of routines, procedures, methods, modules, objects, and the like. Also, program functionality may be allocated among various software layers that are resident within a typical computer (e.g., operating systems, libraries, application programming interfaces (APIs), applications, applets, etc.) It should be appreciated that the invention is not limited to the specific organization and allocation or program functionality described herein.

The present invention can be realized in hardware, software, or a combination of hardware and software. A system according to an illustrative embodiment of the present invention can be realized in a centralized fashion in one computer system, or in a distributed fashion where different elements are spread across several interconnected computer systems. Any kind of computer system (or other apparatus adapted for carrying out the methods described herein) is suitable. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, flash memory, disk drive memory, CD-ROM, and other permanent storage. Additionally, a computer medium may include, for example, volatile storage such as RAM, buffers, cache memory, and network circuits. Furthermore, the signal bearing medium may include signal bearing information in a transitory state medium such as a network link and/or a network interface, including a wired network or a wireless network, that allow a computer to read such signal bearing information.

Referring now to FIG. 10, a computer system suitable for implementing mapping rewriting stages according to an exemplary embodiment of the present invention is illustrated. For example, the illustrative architecture of FIG. 10 may be used in implementing any and all of the components and/or steps described in the context of FIGS. 1 through 9.

As shown, the computer system 1000 may be implemented in accordance with a processor 1001, a memory 1002, I/O devices 1003, and a network interface 1004, coupled via a computer bus 1005 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing data query services. By way of example, a service provider agrees (e.g., via a service level agreement or some informal agreement or arrangement) with a service customer or client to provide data query services. That is, by way of one example only, the service provider may host the customer's web site and associated applications. Then, in accordance with terms of the contract between the service provider and the service customer, the service provider provides data query services which may include one or more of the methodologies of the invention described herein. By way of example, this may include generating a hierarchically structured document in response to at least one user query.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of modifying a relational-to-hierarchical mapping in accordance with at least one user query, the method comprising the steps of:

obtaining at least one query associated with a query language that supports a hierarchical data structure, and obtaining at least one relational-to-hierarchical mapping for use in translating data associated with a relational data structure into data associated with the hierarchical data structure;

modifying the at least one relational-to-hierarchical mapping based on the at least one query such that data specifically relevant to the at least one query may be generated in accordance with the modified relational-to-hierarchical mapping;

analyzing the at least one query to identify one or more expressions associated with the at least one query;

wherein the step of modifying the at least one relational-to-hierarchical mapping based on the at least one query further comprises the steps of:

applying each of the one or more expressions respectively to one or more tagging trees defining the relational-to-hierarchical mapping, each tagging tree comprising one or more nodes, and attaching one or more formulas to appropriate nodes in each tagging tree;

marking the tagging tree nodes traversed during the expression application step as visited;

marking the node corresponding to an output node of the expression as an end node;

superimposing the modified tagging trees respectively resulting from the application of each expression to form a resulting tagging tree; and removing the nodes not marked as visited from the resulting tagging tree, the resulting tagging tree representing the modified relational-to-hierarchical mapping;

wherein at least a portion of the one or more formulas are pushed up from a child node of a tagging tree to a parent node of the tagging tree so as to further limit the amount of data being generated.

2. The method of claim 1, wherein the step of obtaining at least one query associated with a query language that supports a hierarchical data structure further comprises obtaining at least one query associated with an eXtensible Markup Language (XML) based query language.

3. The method of claim 2, wherein the step of obtaining at least one query associated with an XML based query language further comprises obtaining at least one query associated with one of XML Query, eXtensible Stylesheet Language (XSL) and XML Path Language (XPath).

4. The method of claim 1, wherein the one or more expressions comprise one or more XPath expressions.

5. The method of claim 4, further comprising the step of normalizing the one or more XPath expressions.

6. The method of claim 1, wherein at least a portion of the one or more formulas are pushed down from a parent node of a tagging tree to a child node of the tagging tree so as to prune one or more irrelevant subtrees of the tagging tree.

7. The method of claim 1, wherein the step of applying an expression to a tagging tree comprises the steps of:
parsing the expression into constituent main steps and zero or more predicate expressions;
recursively traversing the tagging tree according to the current step in the expression; and
using the predicate expressions to generate one or more formulas reflecting one or more conditions to be imposed on generated data and attaching the one or more formulas to the nodes that generate the data involved in the expression.

8. Apparatus for modifying a relational-to-hierarchical mapping in accordance with at least one user query, comprising:
a memory; and
one or more processors coupled to the memory and operative to: (i) obtain at least one query associated with a query language that supports a hierarchical data structure, and obtain at least one relational-to-hierarchical mapping for use in translating data associated with a relational data structure into data associated with the hierarchical data structure; (ii) modify the at least one relational-to-hierarchical mapping based on the at least one query such that data specifically relevant to the at least one query may be generated in accordance with the modified relational-to-hierarchical mapping; and (iii) analyze the at least one query to identify one or more expressions associated with the at least one query; wherein modifying the at least one relational-to-hierarchical mapping based on the at least one query further comprises: applying each of the one or more expressions respectively to one or more tagging trees defining the relational-to-hierarchical mapping, each tagging tree comprising one or more nodes, and attaching one or more formulas to appropriate nodes in each tagging tree; marking the tagging tree nodes traversed during the expression application step as visited; marking the node corresponding to an output node of the expression as an end node; superimposing the modified tagging trees respectively resulting from the application of each expression to form a resulting tagging tree; and removing the nodes not marked as visited from the resulting tagging tree, the resulting tagging tree representing the modified relational-to-hierarchical mapping, wherein at least a portion of the one or more formulas are pushed up from a child node of a tagging tree to a parent node of the tagging tree so as to further limit the amount of data being generated.

9. The apparatus of claim 8, wherein obtaining at least one query associated with a query language that supports a hierarchical data structure further comprises obtaining at least one query associated with an eXtensible Markup Language (XML) based query language.

10. The apparatus of claim 9, wherein obtaining at least one query associated with an XML based query language further comprises obtaining at least one query associated with one of XML Query, eXtensible Stylesheet Language (XSL) and XML Path Language (XPath).

11. The apparatus of claim 8, wherein the one or more expressions comprise one or more XPath expressions.

12. The apparatus of claim 11, wherein the one or more processors are further operative to normalize the one or more XPath expressions.

13. The apparatus of claim 8, wherein at least a portion of the one or more formulas are pushed down from a parent node of a tagging tree to a child node of the tagging tree so as to prune one or more irrelevant subtrees of the tagging tree.

14. The apparatus of claim 8, wherein applying an expression to a tagging tree comprises:
parsing the expression into constituent main steps and zero or more predicate expressions;
recursively traversing the tagging tree according to the current step in the expression; and
using the predicate expressions to generate one or more formulas reflecting one or more conditions to be imposed on generated data and attaching the one or more formulas to the nodes that generate the data involved in the expression.

15. A method of generating a hierarchically structured document in response to at least one user query, the method comprising the steps of:
obtaining at least one query associated with a query language that supports a hierarchical data structure, and obtaining at least one relational-to-hierarchical mapping for use in translating data associated with a relational data structure into data associated with the hierarchical data structure;
modifying the at least one relational-to-hierarchical mapping based on the at least one query;
generating a hierarchically structured document comprising data specifically relevant to the at least one query in accordance with the modified relational-to-hierarchical mapping; and
analyzing the at least one query to identify one or more expressions associated with the at least one query;
wherein the step of modifying the at least one relational-to-hierarchical mapping based on the at least one query further comprises the steps of:
applying each of the one or more expressions respectively to one or more tagging trees defining the relational-to-hierarchical mapping, each tagging tree comprising one or more nodes, and attaching one or more formulas to appropriate nodes in each tagging tree;
marking the tagging tree nodes traversed during the expression application step as visited;
marking the node corresponding to an output node of the expression as an end node;
superimposing the modified tagging trees respectively resulting from the application of each expression to form a resulting tagging tree; and
removing the nodes not marked as visited from the resulting tagging tree, the resulting tagging tree representing the modified relational-to-hierarchical mapping;
wherein at least a portion of the one or more formulas are pushed up from a child node of a tagging tree to a parent node of the tagging tree so as to further limit the amount of data being generated.

16. A method of providing a data query service, the method comprising the step of:
a service provider providing the data query service comprising: (i) obtaining at least one query associated with a query language that supports a hierarchical data structure, and obtaining at least one relational-to-hierarchical mapping for use in translating data associated with a relational data structure into data associated with the hierarchical data structure; (ii) modifying the at least one relational-to-hierarchical mapping based on the at least one query; (iii) generating a hierarchically structured document comprising data specifically relevant to the at least one query in accordance with the modified relational-to-hierarchical mapping; and (iv) analyzing the at least one query to identify one or more expressions associated with the at least one query; wherein the step of modifying the at least one relational-to-hierarchical mapping based on the at least one query further comprises the steps of: applying each of the one or more expressions respectively to one or more tagging trees defining the relational-to-hierarchical mapping, each tagging tree comprising one or more nodes, and attaching one or more formulas to appropriate nodes in each tagging tree; marking the tagging tree nodes traversed during the expression application step as visited; marking the node corresponding to an output node of the expression as an end node; superimposing the modified tagging trees respectively resulting from the application of each expression to form a resulting tagging tree; and removing the nodes not marked as visited from the resulting tagging tree, the resulting tagging tree representing the modified relational-to-hierarchical mapping; wherein at least a portion of the one or more formulas are pushed up from a child node of a tagging tree to a parent node of the tagging tree so as to further limit the amount of data being generated.

* * * * *